(12) United States Patent
Welch et al.

(10) Patent No.: US 7,318,575 B2
(45) Date of Patent: Jan. 15, 2008

(54) COOKING FORM

(76) Inventors: Michelle C. Welch, 12087 S. 1800 West, Riverton, UT (US) 84065; Grant Williams, 1444 Stratford Ave., Salt Lake City, UT (US) 84106

( * ) Notice: Subject to any disclaimer, the term of this patent is extended or adjusted under 35 U.S.C. 154(b) by 294 days.

(21) Appl. No.: 10/959,943

(22) Filed: Oct. 5, 2004

(65) Prior Publication Data

US 2005/0076791 A1    Apr. 14, 2005

Related U.S. Application Data

(60) Provisional application No. 60/509,926, filed on Oct. 8, 2003, provisional application No. 60/510,661, filed on Oct. 9, 2003.

(51) Int. Cl.
*A47J 43/18*    (2006.01)
*A47J 45/10*    (2006.01)

(52) U.S. Cl. .................. 249/135; 249/DIG. 1; 426/512; 426/515; 99/426

(58) Field of Classification Search ................ 249/135, 249/DIG. 1; 426/512, 515; 30/325; 99/426
See application file for complete search history.

(56) References Cited

U.S. PATENT DOCUMENTS

| | | | |
|---|---|---|---|
| 323,887 A * | 8/1885 | Butter | 249/119 |
| 2,497,280 A | 2/1950 | Stier | |
| D162,798 S | 4/1951 | Ebbott | |
| 2,824,510 A * | 2/1958 | Gangwer | 99/423 |
| 3,060,494 A * | 10/1962 | Noble | 249/55 |
| 3,780,978 A | 12/1973 | Proul | |
| D246,495 S | 11/1977 | Montano | |
| 4,345,516 A | 8/1982 | Sinclair | |
| D316,950 S | 5/1991 | Kaiser | |
| D317,848 S | 7/1991 | Kaiser | |
| D329,003 S | 9/1992 | Jones | |
| D333,761 S | 3/1993 | Dicochea | |
| 5,230,156 A | 7/1993 | Patenaude | |
| D345,487 S | 3/1994 | Vitantonio | |
| D347,976 S | 6/1994 | Lombardi | |
| D347,977 S | 6/1994 | Becht | |

(Continued)

OTHER PUBLICATIONS

Michelle C. Welch, Declaration of Michelle C. Welch Regarding Non-Documentary Information Publicly Available Prior to Earliest Filing Date, dated Sep. 29, 2004.

*Primary Examiner*—Yogendra N. Gupta
*Assistant Examiner*—Dimple Bodawala
(74) *Attorney, Agent, or Firm*—Clayton, Howarth & Cannon, P.C.

(57) ABSTRACT

A form is disclosed for cooking items, such as pancakes, in a specified shape. The form may include a sidewall defining the specified shape. One or more handles may be attached to the sidewall to facilitate handling of the form. The handles may be configured to be folded and to reduce the amount of heat conducted through them. The form may be constructed by cutting an aluminum alloy material into strips. Holes may be formed in the ends of the strips and the strips may be heated for a specified time to soften them for being formed in the desired shape. The ends of the strips may be joined together using fasteners through the holes. Forms constructed in this manner may reduce the sticking of material to the forms, and the forms may be durable to last for repeated use over a long period of time.

48 Claims, 3 Drawing Sheets

U.S. PATENT DOCUMENTS

| | | |
|---|---|---|
| D411,786 S | 7/1999 | Cianci |
| D411,787 S | 7/1999 | Cianci |
| 6,065,393 A * | 5/2000 | Lombard et al. ............. 99/427 |
| 6,813,994 B2 * | 11/2004 | Williams .................... 99/426 |
| 7,011,015 B1 * | 3/2006 | Marghella .................... 99/427 |

\* cited by examiner

COOKING FORM

CROSS-REFERENCE TO RELATED APPLICATIONS

This application claims the benefit of U.S. Provisional Application No. 60/509,926, filed Oct. 8, 2003, and U.S. Provisional Application No. 60/510,661, filed Oct. 9, 2003 which applications are hereby incorporated by reference herein in their entireties, including but not limited to those portions that specifically appear hereinafter, the incorporation by reference being made with the following exception: In the event that any portion of the above-referenced provisional applications is inconsistent with this application, this application supercedes said above-referenced provisional applications.

STATEMENT REGARDING FEDERALLY SPONSORED RESEARCH OR DEVELOPMENT

Not Applicable.

BACKGROUND

1. The Field of the Invention

The present disclosure relates generally to kitchen utensils, and more particularly, but not necessarily entirely, to devices and methods for forming items in a desired shape and methods for constructing such devices.

2. Description of Related Art

It is common practice to shape food items in a form to enhance the appearance of the food and increase the enjoyment of meals. For example, it is common to pour pancake batter into a pan or on a griddle in a configuration to form different shapes. Some simple shapes may be adequately formed without the use of shaping devices. For example, disc or egg shaped items may be easily formed by placing the batter in the desired configuration and cooking the batter such that the pancake is formed in the desired shape. Other more complex shapes, such as animals or letters, may be more difficult to form without the assistance of a mold or form.

Pancake molds are known in the art to confine the flow of batter to a desired shape until the batter is cooked into a firm condition. However, the pancake molds known in the art are commonly difficult to manipulate. The molds commonly have a single handle which makes the mold difficult to control to prevent damaging the pancake. Moreover, the handles are often formed as a rigid member extending from the mold which takes up considerable space and makes storing the mold difficult.

The known pancake molds are commonly formed of a material and configuration that does not heat and cool evenly thereby making it difficult to cook pancakes uniformly. Also, it is often difficult to remove the mold from the pancake due to the pancake sticking on the mold. The known pancake molds are also often difficult to clean and commonly rust. Moreover, since the molds are repeatedly heated and cooled, the molds often lose their shape and warp after time. This may make the molds unsuitable for use since batter may be allowed to flow out of the mold and the desired shape may not be formed.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. Also, as used herein, the terms "comprising," "including," "containing," "characterized by," and grammatical equivalents thereof are inclusive or open-ended terms that do not exclude additional, unrecited elements or method steps.

Figure 1:
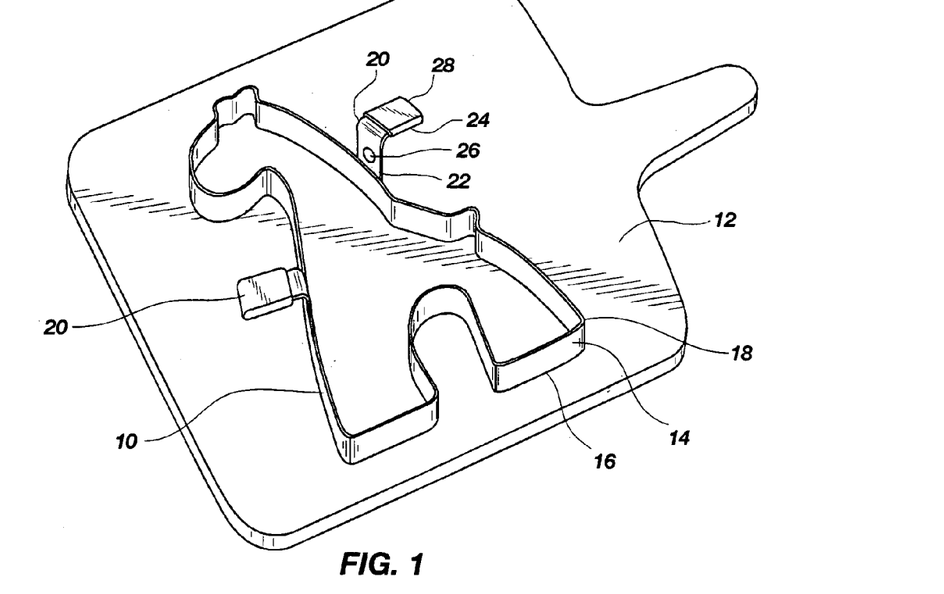
FIG. 1 is a perspective view of a cooking form made in accordance with the principles of the present disclosure, the cooking form is shown placed on a cooking surface.

Referring now to FIG. 1, a perspective view is shown of an apparatus or cooking form 10 in accordance with the principles of the present disclosure. The form 10 may be used for various purposes, such as cooking, to form items in various different shapes. It will be understood that the items to be molded may include food or non-food items. For example, the items to be cooked may include any variety of food items such as pancakes or eggs, for example, or any other items in which it may be desired to form the item in a particular shape to enhance the aesthetic appearance of the item or otherwise improve the interest or enjoyment of the item. It will also be understood that the form 10 may be used for other applications besides cooking, within the scope of the present disclosure. For example, the form 10 may be used to cut cakes or cookie dough in the specified shape, or the form 10 may be used to hold a flowing item in place until it dries.

The form 10 may be used in combination with a cooking surface 12, such as a griddle, pan or skillet for example, or any other of a variety of cooking surfaces known in the art such that heat may be transferred to an item to be cooked. The cooking surface 12 may be self heating, or the cooking surface 12 may be placed on a stove or in an oven. Accordingly, the form 10 may be used in frying or baking situations. The cooking surface 12 may form a planar surface having an area large enough to receive the form 10 thereon. The cooking surface 12 may be treated with any variety of substances to prevent or reduce sticking of the item to be cooked in a manner known in the art.

Figure 2:
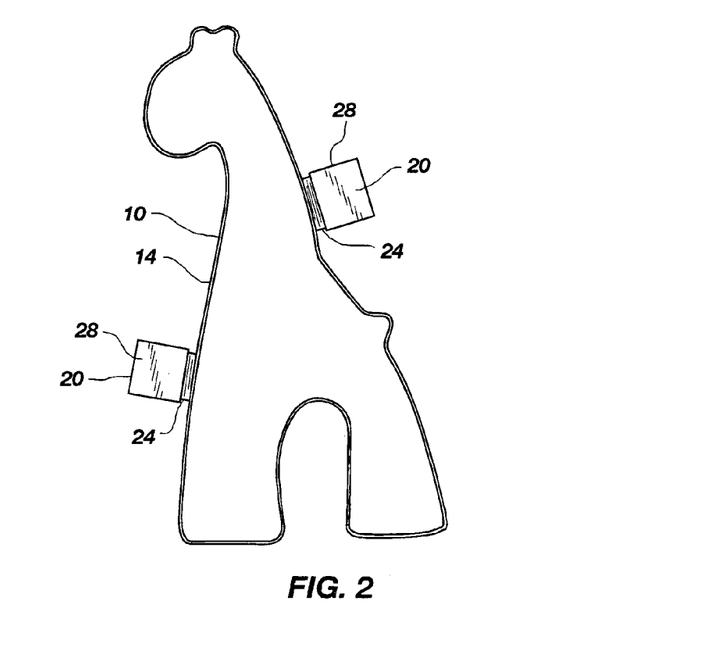
FIG. 2 is a top view of the cooking form of FIG. 1.

As shown in FIGS. 1-2, the form 10 may be formed in a specified shape, such as the shape of a giraffe. However, it will be appreciated that the form 10 may be formed in any of a variety of shapes such as animals, plants, creatures, vehicles, geometric shapes, objects, symbols, or holiday ornamentations for example, or any other shape, and be within the scope of the present disclosure.

The form 10 may include a continuous sidewall 14 forming an endless loop defining an area in the specified shape. The sidewall 14 may extend in an upward direction when in use on the cooking surface 12. The sidewall 14 may have a free bottom end 16 and a free top end 18. The term "free end" as used herein refers broadly to the concept of an object that terminates in open space without being completely obstructed from its surrounding environment. Accordingly, the sidewall 14 may define a perimeter or boundary with an open top and bottom such that items to be molded may be permitted to pass through the top and bottom of the form 10. The sidewall 14 may have a uniform thickness between the bottom end 16 and the top end 18, and along a majority of the perimeter of the sidewall 14. Alternatively, the sidewall 14 may have a closed top and an open bottom, if desired.

The bottom end 16 of the sidewall 14 may form a planar perimeter configured for placement on the cooking surface 12 such that a continuous barrier may be formed by the sidewall 14 contacting the cooking surface 12. Accordingly, the bottom end 16 of the sidewall 14 may reside in a single plane which may be configured to rest on the cooking surface 12 such that when a flowable material, such as pancake batter, is placed within the form 10, the sidewall 14 may form a barrier to prevent the batter from flowing outside the form 10. The top of the form 10 may also be open, without obstructions, such that items may be placed in the form 10 while the form 10 is supported on the cooking surface 12. It is to be understood that the term "flowable material" as used herein shall refer broadly to any suitable flowable material that may be cooked or cured, whether edible or inedible.

The form 10 may also include at least one handle 20 for manipulating the form 10. The form 10 may have two handles 20 on opposing sides of the form to enhance the ability to control the form 10. It will be understood that the form 10 may have other quantities of handles 20 and be within the scope of the present disclosure. With handles 20 on opposing sides of the form 10, the form 10 may be more easily lifted on one side of the form 10 or the other to tip the form 10 in a desired direction to have better control of the form 10.

The form 10 may be constructed as desired to constitute a solid rigid member, or a resilient, flexible member. In the latter case, the two handles 20 may be pulled in opposing directions to slightly deflect the form 10 which may facilitate releasing the item to be molded from the form 10. Accordingly, removal of the form 10 from the cooking surface 12 may be controlled better to prevent damaging of the item being molded.

The handles 20 may include an upward extending portion 22 configured to be attached to the sidewall 14 and a lateral extending portion 24 configured to facilitate grasping the handle 20 and lifting the form 10. The lateral extending portion 24 may be configured to allow a user to support the form 10 from underneath the handle 20. In one embodiment of the present disclosure, the lateral extending portion 24 may extend in a substantially perpendicular orientation with respect to the upward extending portion 22. It will be appreciated, however, that the handles 20 may have other shapes or configurations within the scope of the present disclosure.

The upward extending portion 22 may be formed as a planar member configured to abut the sidewall 14. As shown most clearly in FIG. 3, the upward extending portion 22 may include one or more openings 26 to reduce the amount of heat conducted from the sidewall 14 through the upward extending portion 22 to the lateral extending portion 24. The opening 26 may form a space comprising approximately 25-75 percent of the width of the upward extending portion 22, at the widest portion of the opening 26. For example, the upward extending portion 22 may be 0.75 inches wide and the opening may be circular, having a diameter of 0.375 inches such that the percentage of the width of the upward extending portion 22 covered by the space at the widest part of the opening 26 may be 50 percent. It will be understood that the opening 26 may have various different shapes and diameter sizes and may assume any shape or diameter size that is physically possible, and that the number of openings 26 may vary.

Figure 3:
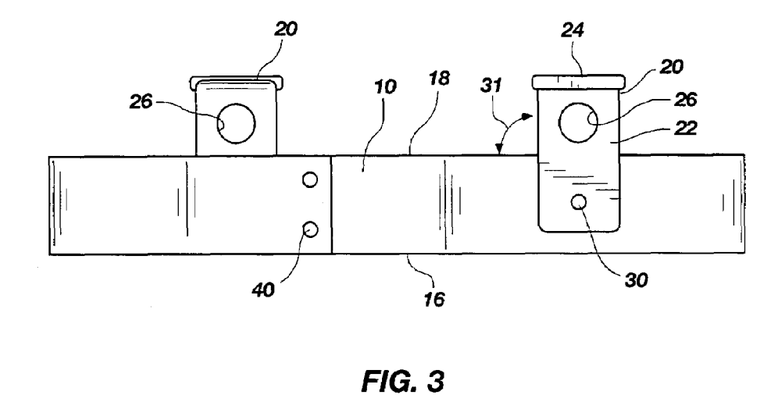
FIG. 3 is an enlarged side view of the cooking form of FIG. 1.

The handles 20 may also include a grasping portion 28 that may include an insulation material to further prevent transferring heat from the form 10 through the handle 20 to the user of the form 10. The grasping portion 28 may also be formed of a material that facilitates grasping of the handle 20 without slipping. The grasping portion 28 may be positioned on the lateral extending portion 24.

The handles 20 may also be configured such that the length of the upward extending portion 22 reduces the amount of heat at the grasping portion 28. For example, one embodiment of the present disclosure includes the lateral portion 24 of the handle 20 that may be spaced apart from the sidewall 14 in an upward direction (including a vertical direction) by a distance of at least ¾ inch, during use.

The handles 20 may also include a connection 30 that allows the handles to be folded or otherwise oriented such that the space required to store the form 10 may be reduced. The connection 30 may be a pivotal connection and may include a fastener, such as a rivet, attached so as to allow the handle 20 to pivot about the connection 30, as indicated by the arrow 31 in FIG. 3. Accordingly, when the form 10 is not in use, the handle 20 may be rotated so as to extend along the sidewall 14 thereby reducing the height of the form 10, and reducing the area required to stack and store the form 10. It will be understood that friction between the handle 20 and the sidewall 14 or the connection 30 may prevent the handle 20 from moving under the force of gravity. Accordingly, additional force may be required to move the handle 20 so that the handle 20 may not fall to the cooking surface 12 when the form 10 is in use. Also, the handle 20 may be attached to the sidewall 14 in an orientation so as to prevent the handle from pivoting into the area encompassed by the sidewall 14. This may reduce the chance of damaging the molded item by contact with the handle 20 if the handle 20 is inadvertently folded during use.

A method of forming the form 10 will now be discussed. The form 10 may be constructed of an aluminum alloy material, similar to the type of material used in constructing aircraft, for example. The form 10 formed of an aluminum alloy material may be light weight and may have good flexibility and elasticity characteristics that facilitate removal of the molded item from the form 10. Moreover, the form 10 made of aluminum alloy may be strong to maintain the desired shape over long periods of repeated use and the form 10 can be washed without rusting. It will be appreciated that other materials having suitable strength, durability, elasticity, thermal conductivity and flexibility characteristics may be used to construct the form 10 within the scope of the present disclosure.

Figure 4:
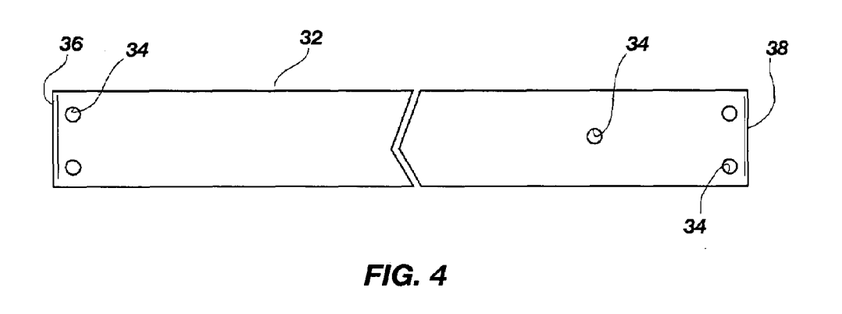
FIG. 4 is an enlarged side view of a portion of a strip used to form a sidewall of the cooking form of FIG. 1, a center portion of the strip has been removed in the drawing indicating that the strip may have various different lengths.

The aluminum alloy material may be obtained in sheets, such as 6061 aluminum plate in T6 temper, 0.032 inches thick, per federal specification QQ-A-250/11, for example. It will be understood that other tempers and thicknesses may be used in accordance with the principles of the present disclosure. As shown in FIG. 4, the sheets may be sheared in strips 32 having a width of the desired sidewall height, such as approximately ¾ inch, for example. It will be understood that the sidewall height may have dimension tolerances of plus or minus 0.005 inches, for example. The thickness of the strips 32 may be relatively thin corresponding to the thickness of the sheet material used to make the strips 32, such as a thickness within in a range of between approximately 0.02 to 0.04 inches, for example. The length of the strips 32 may vary depending on the particular shape desired to be formed. It will be appreciated, however, that the strips 32 may be formed of various different dimensions within the scope of the present disclosure.

Holes 34 may be formed in the strips 32 near a first end 36 and a second end 38 of the strips 32, and at locations where the handles 20 are to be attached. It will be understood that the locations of the handles 20 may vary depending upon the shape of the form 10. The holes 34 may be formed by drilling, punching or any other method known in the art. The strips 32 may be stacked on top of each other so that multiple holes 34 may be drilled at the same time during construction. It will be understood that the number of holes 34 may vary, and that alternative embodiments of the present disclosure may either include, or exclude, the holes 34.

The strips 32 may be partially annealed or heated to a specified temperature, such as approximately 650 degrees Fahrenheit (F) plus or minus fifty degrees or thirty degrees or ten degrees, for example, for a specified time period, such as approximately twenty, thirty or forty minutes, for example. A specific example would be to heat the strips 32 to 690 degrees Fahrenheit plus or minus ten degrees for approximately thirty minutes. By being partially annealed, rather than being annealed to the softest condition of the material, the strips 32 may obtain physical characteristics that may be beneficial for use in the form 10. For example, the strips 32 may be in a form suitable for bending, yet additional heat treating, chemical etching and rinsing may not be required such that the form 10 may have a desirable finish that reduces sticking of items to the form 10.

The strips 32 may be placed in any variety of heating device known in the art, such as a recirculating air furnace or an oven for example, capable of heating the strips 32 to the specified temperature for the specified time. Heating the strips 32 may place the strips 32 in a softened or malleable condition so that they may be configured in the desired shape. After the strips 32 have been heated for the specified time, they may be removed from the furnace and air cooled. A logo or other identifying information may be stamped or otherwise placed on the strips 32.

The strips 32 may then be formed to the desired shape by wrapping the strips 32 around a form or blank, for example, such that the strips 32 may be configured to make an endless loop with the first end 36 of the strip 32 contacting the second end 38 of the strip 32 in an overlapping arrangement. The holes 34 in the first end 36 and the second end of the strips 32 may be aligned for receiving a fastener 40, such as a rivet, for fixing the strip 32 in the specified shape. The overlapping first end 36 and second end 38 may form part of the sidewall 14 defining the specified shape. In other words, the inside of the first end 36 may be attached to the outside of the second end 38, or vice versa, rather than attaching the inside of the first end 36 with the inside of the second end 38, which may form a protruding edge that extends outside the perimeter of the form 10 and requires the use of additional material. The portion of the strip 32 corresponding to the bottom end 16 of the form 10 may be straightened to reside in a single plane to be positioned flush on a flat surface, such as the cooking surface 12. It will be understood that the strips 32 may be formed in the desired shape without the use of a form, and that other attachment means, such as welding or adhesives, for example, may be used to join the first end 36 of the strip 32 with the second end 38 of the strip 32. Similarly, the handles 20 may be attached to the strip 32 using fasteners 40 or other attachment means known in the art. The grasping portion 28 may be attached to the handles 20 using adhesives or any other suitable attachment means known in the art. This method of forming the form 10 may provide a form 10 that reduces sticking of the cooked item to the sidewall 14 as compared to other methods of forming the form 10. Accordingly, the form 10 may lift easier from the cooked item. Moreover, the form 10 formed by this method may have an improved surface finish and the form 10 may be produced faster with fewer steps than other methods of forming the form 10.

In an alternative process for forming the form 10, the strips 32 may be sheared and cut to length, and holes 34 may be formed in the strips 32 as described above. The strips 32 may be annealed to the "0" condition, or the softest condition of the material, by heating the strips 32 to approximately 800 degrees F., plus or minus 10 degrees, for approximately one hour, for example. The strips 32 may then be slowly cooled in the furnace to below approximately 400 degrees F., then air or furnace cooled at any convenient rate. The strips 32 may then be in a softened state for being formed in the desired configuration to form the form 10. The ends of the strip 32 may be fastened together and a logo or other identifying information may be placed on the form 10.

The form 10 may then be heat treated by heating the form 10 to a heated condition in a furnace at approximately 970-980 degrees F., and holding the temperature for a hold time of approximately 30 minutes, for example. To facilitate handling and processing of the forms 10, the forms 10 may be stacked in a stainless steel basket, up to three forms deep, for example. After the hold time is completed, the form 10 may then be removed from the furnace and quenched in a liquid for cooling the form 10. The quenching liquid may include a material such as a 10-12 percent polyalkaline glycol solution, or other suitable quenching solution known in the art. The form 10 may be quenched immediately after removal from the furnace, for example, a maximum delay for quenching the form 10 may be approximately seven seconds from the time the form 10 is removed from the furnace. The form 10 may then need to be straightened to sit flush on a flat surface, since the heat treating step may cause the form 10 to warp or change shape. It may be necessary to straighten the form 10 within a limited time, such as an hour, after the quenching process so that the form 10 does not harden in a warped shape.

After the form 10 has been straightened, the form 10 may be age hardened to a T6 temper condition by re-heating the form 10 to approximately 350 degrees F., plus or minus 10 degrees, for approximately 8 hours. The form 10 may then be cooled by an air cooling process, or other suitable cooling process known in the art. It will be understood that other temperatures and heating times may be used for the steps in the methods discussed in the present disclosure.

In this procedure, the heat treatment may also tarnish the form 10 such that the form may need to be etched to form an un-tarnished finished surface. Etching may be accomplished by dipping the form 10 in a chemical etching material to provide a suitable finish to the form 10. The chemical etching material may include a sodium hydroxide etch, for example, or any other suitable etching material known to those skilled in the art. The etching material may remove the oxides formed on the form 10 during the heat treatment process. The form 10 may be rinsed in a rinsing solution after the chemical etching has been completed to remove any remaining traces of etching material from the form 10. The form 10 may then be placed in a clear water immersion rinse for a minimum of approximately 30 seconds and then completely dried. The handles 20 may be formed, treated, etched, and rinsed in a similar manner and attached to the sidewall 14 using a fastening means as previously discussed. The grasping portion 28 may be attached to the handles 20, as in the previously discussed method, using adhesives or any other suitable attachment means known in the art. The form 10 formed in this process may be strong and have high elastic memory characteristics. Accordingly, the form 10 may be less susceptible to being warped or distorted during the repeated heating and cooling conditions encountered during use in cooking.

A further alternative process for manufacturing the form 10 may include the use of power mechanized bending equipment that may allow bending of the strips 32 without the need for any type of heat treatment or other softening of the strips 32. The power bending machinery may include any variety of equipment known to those skilled in the art having adequate strength to allow bending of strips 32 of various thicknesses, such as 0.040 inches thick, or greater, for example. Accordingly, the form 10, in some embodiments of the present disclosure, may be formed by maintaining the strip 32 in a hardened condition without softening by heat treatment, such as without being annealed, partially annealed or heated to a softened or malleable condition.

It will be understood that the handles 20 may be made of a material having a thermal conductivity less than or equal to approximately 1160 BTU-inches/hour-ft$^2$-° F. Handles made of materials with lower thermal conductivity properties may reduce the amount of heat transferred from the cooking surface 12 to the grasping portion 28 of the handle 20. Moreover, the sidewall 14 may also be constructed of a material having a thermal conductivity less than or equal to approximately 1160 BTU-inches/hour-ft$^2$-° F. Thus, the handles 20 may be formed of the same material as the sidewall 14, or the handles 20 may be made from a material that is different from the material used to make the sidewall 14.

In use, a non-sticking agent, such as grease or cooking oil or spray, may be applied to the interior surface of the sidewall 14. The form 10 may then be placed on the cooking surface 12 such that the bottom end 16 of the sidewall 14 sits flush on the cooking surface 12. The material to be cooked, such as pancake batter, may be poured through the top of the form 10 such that it spreads in the area confined by the sidewall 12 in the specified shape. Once the batter has cooked sufficiently to be firm enough to maintain the shape without additional spreading, the form 10 may be removed by lifting up on the handles 20 to remove the form 10 from the cooking surface 12. The item to be cooked may remain on the cooking surface 12 and may be cooked and turned as desired until the cooking process is finished. The form 10 may be cleaned by hand or in a dishwasher after use, and may be re-used repeatedly. The form 10 is durable and not susceptible to rust. The handles 20 may be folded to a compact configuration for storage such that the form 10 utilizes less space and is more convenient to store.

Figure 5:
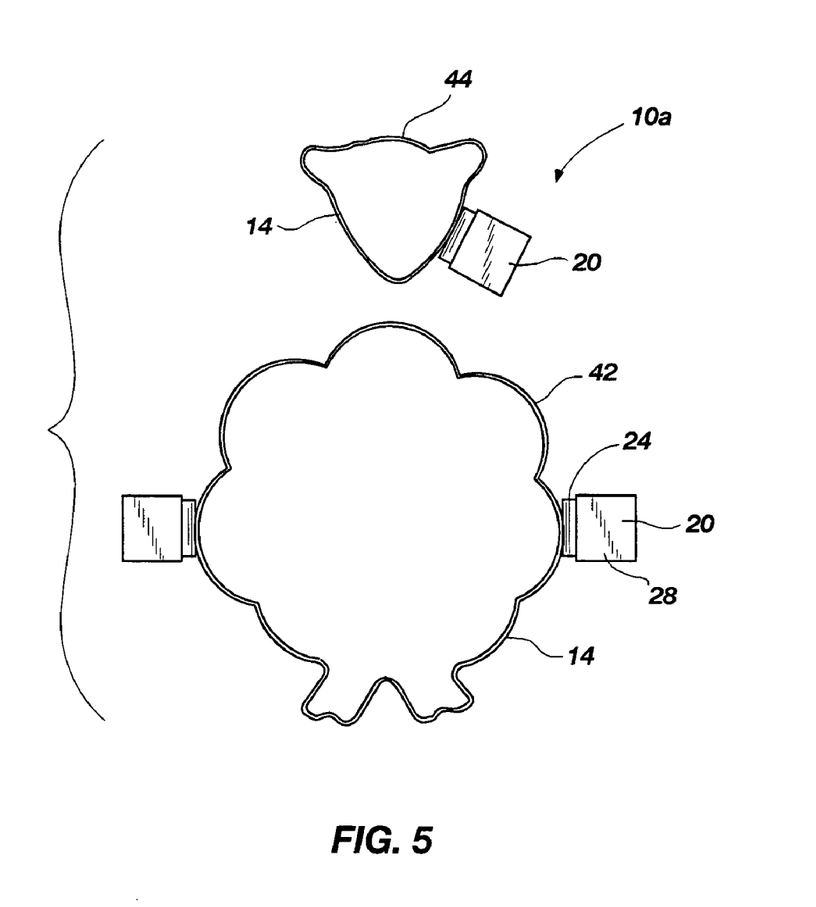
FIG. 5 is a top view of an alternative embodiment cooking form having two pieces.

Referring now to FIG. 5, an alternate embodiment form is shown indicated generally at 10*a*. As previously discussed, the presently disclosed embodiments illustrated herein are merely exemplary of the possible embodiments of the disclosure, including that illustrated in FIG. 5.

It will be appreciated that the embodiment of the disclosure illustrated in FIG. 5 contains many of the same structures represented in FIGS. 1-4 and only the new or different structures will be explained to most succinctly explain the additional features which come with the embodiment of FIG. 5. The alternate embodiment form 10*a* may include multiple discrete portions. As used herein, the phrase "discrete portions" refers to portions of the form that may be unconnected and movable with respect to each other to provide separate and distinct parts of the form. For example, the alternate embodiment form 10*a* may have a first portion 42 and a second portion 44. The first portion 42 may correspond to a part of a shape, such as a body of a lamb, and the second portion 44 may correspond to another part of the shape, such as the lamb's head. It will be understood that the form 10*a* may include any number of discrete portions that can be combined together to form a particular shape.

It will be understood that the alternative embodiment form 10*a* may be used to form a food item in a specified shape. For example, the first portion 42 of the form 10*a* may be placed on a surface and a first flowable material, such as pancake batter, may be placed on the surface circumscribed by the first portion 42. The flowable material may be cooked to form a first part of the food item, in the shape of a body for example. The second portion 44 of the form 10*a* may be placed on the surface and a second flowable material may be placed on the surface circumscribed by the second portion 44 of the form 10*a*. The second flowable material may also be cooked to form a second part of the food item, in the shape of a head, for example. The first part may be removed from the first portion 42 and the second part may be removed from the second portion 44. The first part and the second part may be combined to form the food item. For example, the second part may form the head of a lamb, and may be stacked on the first part, which may form the body of the lamb. It will be understood, however, that various different shapes may be formed, and that some embodiments may not require stacking of parts on top of each other. Moreover, different flowable materials may be used in the different portions of the form 10*a*, or the same type of flowable material may be used in each portion of the form 10*a*.

It will be appreciated that the structure and apparatus disclosed herein is merely one example of a means for attaching (attachment means), and it should be appreciated that any structure, apparatus or system for attaching which performs functions the same as, or equivalent to, those disclosed herein are intended to fall within the scope of an attachment means, including those structures, apparatus or systems for attaching which are presently known, or which may become available in the future. Anything which functions the same as, or equivalently to, an attachment means falls within the scope of this element.

In accordance with the features and combinations described above, a useful method forming an apparatus for shaping items includes the steps of:

(a) forming a material into a strip;
(b) heating the strip of material to a specified temperature for a specified time;
(c) cooling the strip of material; and
(d) forming the strip of material in an endless loop in a specified shape.

Those having ordinary skill in the relevant art will appreciate the advantages provide by the features of the present disclosure. For example, it is a feature of the present disclosure to provide an apparatus for cooking an item in a specified shape which is simple in design and manufacture. Another feature of the present disclosure is to provide such an apparatus that is durable enough for repeated use over a long period of time. It is a further feature of the present disclosure, in accordance with one aspect thereof, to provide an apparatus that reduces sticking of the cooked item to the apparatus. An additional feature of the present disclosure is to provide such an apparatus that can be easily manipulated with handles, and which the handles reduce heat transferred to the users. Another feature of the present disclosure is to provide such an apparatus that can be placed in a compact configuration for storage. An additional feature of the present disclosure is to provide a method of manufacturing such an apparatus that is simple and has few steps.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus for forming an item in a specified shape, said apparatus comprising:

a sidewall defining an area in said specified shape, said sidewall having a free bottom end forming a perimeter configured for placing in contact with a surface;

wherein said sidewall is comprised of an aluminum alloy material that has been partially annealed by heating the material to a specified temperature for a specified time.

2. The apparatus of claim 1, wherein the specified temperature is within a range of between approximately 640 to 660 degrees F.

3. The apparatus of claim 1, wherein the specified time is approximately 30 minutes.

4. The apparatus of claim 1, further comprising a first handle on a first side of said sidewall.

5. The apparatus of claim 4, further comprising a second handle on a second side of said sidewall.

6. The apparatus of claim 1, wherein said first handle comprises an upward extending portion and a lateral extending portion.

7. The apparatus of claim 6, wherein said lateral extending portion is positioned in a substantially perpendicular orientation with respect to said upward extending portion.

8. The apparatus of claim 6, wherein said upward extending portion comprises an opening for reducing the flow of heat from said upward extending portion to said lateral extending portion.

9. The apparatus of claim 8, wherein said opening forms a space in said upward extending portion such that said space comprises a range of approximately 25 to 75 percent of a width of the upward extending portion at a widest portion of said opening.

10. The apparatus of claim 9, wherein said opening forms a space comprising approximately 50 percent of the width of the upward extending portion at the widest portion of said opening.

11. The apparatus of claim 6, wherein said lateral extending portion is spaced a distance above said sidewall during use.

12. The apparatus of claim 4, wherein said first handle is pivotally attached to said sidewall to allow said first handle to be rotated alongside said sidewall.

13. The apparatus of claim 4, wherein said first handle is constructed of a material having a thermal conductivity less than or equal to approximately 1160 BTU-inches/hour-ft$^2$-° F.

14. The apparatus of claim 13, wherein said sidewall is constructed of a material having a thermal conductivity less than or equal to approximately 1160 BTU-inches/hour-ft$^2$-° F.

15. The apparatus of claim 6, wherein said lateral extending portion comprises a grasping portion comprising a material configured to reduce the transfer of heat from the lateral extending portion.

16. The apparatus of claim 1, wherein said sidewall further comprises a free top end.

17. An apparatus for forming an item in a specified shape, said apparatus comprising:

a sidewall defining an area in said specified shape, said sidewall having a free bottom end forming a perimeter configured for placing in contact with a surface; and a first handle attached to said sidewall, said first handle defining an upward extending portion, and a lateral extending portion;

wherein said upward extending portion comprises an opening for reducing the flow of heat from said upward extending portion to said lateral extending portion;

wherein said opening forms a space in said upward extending portion such that said space comprises a range of approximately 25 to 75 percent of a width of the upward extending portion at a widest portion of said opening.

18. The apparatus of claim 17, further comprising a second handle attached to said sidewall.

19. The apparatus of claim 17, wherein said lateral extending portion is positioned in a substantially perpendicular orientation with respect to said upward extending portion.

20. The apparatus of claim 17, wherein said opening forms a space comprising approximately 50 percent of the width of the upward extending portion at the widest portion of said opening.

21. The apparatus of claim 17, wherein said lateral extending portion is spaced a distance above said sidewall during use.

22. The apparatus of claim 17, wherein said first handle is pivotally attached to said sidewall to allow said first handle to be rotated alongside said sidewall.

23. The apparatus of claim 17, wherein said first handle is constructed of a material having a thermal conductivity less than or equal to approximately 1160 BTU-inches/hour-ft$^2$-° F.

24. The apparatus of claim 17, wherein said sidewall is constructed of a material having a thermal conductivity less than or equal to approximately 1160 BTU-inches/hour-ft$^2$-° F.

25. The apparatus of claim 17, wherein said lateral extending portion comprises a grasping portion comprising a material configured to reduce the transfer of heat from the lateral extending portion.

26. The apparatus of claim 17, wherein said sidewall further comprises a free top end.

27. The apparatus of claim 17, wherein said upward extending portion of said first handle abuts said sidewall.

28. An apparatus for forming an item in a specified shape, said apparatus comprising:
a sidewall defining an area in said specified shape, said sidewall having a free bottom end forming a perimeter configured for placing in contact with a surface; and
a first handle on a first side of said sidewall, said first handle comprising an upward extending portion and a lateral extending portion, said first handle being configured to fold alongside said sidewall such that said apparatus can be arranged in a compact configuration for storage;
wherein said upward extending portion comprises an opening for reducing the flow of heat from said upward extending portion to said lateral extending portion;
wherein said opening forms a space in said upward extending portion such that said space comprises a range of approximately 25 to 75 percent of a width of the upward extending portion at a widest portion of said opening.

29. The apparatus of claim 28, further comprising a second handle on a second side of said sidewall.

30. The apparatus of claim 28, wherein said lateral extending portion is positioned in a substantially perpendicular orientation with respect to said upward extending portion.

31. The apparatus of claim 28, wherein said opening forms a space comprising approximately 50 percent of the width of the upward extending portion at the widest portion of said opening.

32. The apparatus of claim 28, wherein said lateral extending portion is spaced a distance above said sidewall during use.

33. The apparatus of claim 28, wherein said first handle is constructed of a material having a thermal conductivity less than or equal to approximately 1160 BTU-inches/hour-ft$^2$-° F.

34. The apparatus of claim 28, wherein said sidewall is constructed of a material having a thermal conductivity less than or equal to approximately 1160 BTU-inches/hour-ft$^2$-° F.

35. The apparatus of claim 28, wherein said lateral extending portion comprises a grasping portion comprising a material configured to reduce the transfer of heat from the lateral extending portion.

36. The apparatus of claim 28, wherein said sidewall further comprises a free top end.

37. The apparatus of claim 28, wherein said first handle is pivotally attached to said sidewall.

38. An apparatus for forming an item in a specified shape, said apparatus comprising:
a sidewall defining an area in said specified shape, said sidewall having a free bottom end forming a perimeter configured for placing in contact with a surface; and
a first handle on a first side of said sidewall and a second handle on a second side of said sidewall, said first handle and said second handle each comprising a lateral extending portion, said lateral extending portion being upwardly spaced apart from said sidewall in use such that heat transfer from said sidewall to said lateral extending portion may be reduced;
wherein said first handle and said second handle each comprises an upward extending portion;
wherein said upward extending portion comprises an opening for reducing the flow of heat from said upward extending portion to said lateral extending portion;
wherein said opening forms a space in said upward extending portion such that said space comprises a range of approximately 25 to 75 percent of a width of the upward extending portion at a widest portion of said opening.

39. The apparatus of claim 38, wherein said lateral extending portion is positioned in a substantially perpendicular orientation with respect to said upward extending portion.

40. The apparatus of claim 38, wherein said opening forms a space comprising approximately 50 percent of the width of the upward extending portion at the widest portion of said opening.

41. The apparatus of claim 38, wherein said first handle and said second handle are pivotally attached to said sidewall to allow said first handle and said second handle to be rotated alongside said sidewall.

42. The apparatus of claim 38, wherein said first handle and said second handle are constructed of a material having a thermal conductivity less than or equal to approximately 1160 BTU-inches/hour-ft$^2$-° F.

43. The apparatus of claim 38, wherein said sidewall is constructed of a material having a thermal conductivity less than or equal to approximately 1160 BTU-inches/hour-ft$^2$-° F.

44. The apparatus of claim 38, wherein said lateral extending portion comprises a grasping portion comprising a material configured to reduce the transfer of heat from the lateral extending portion.

45. The apparatus of claim 38, wherein said sidewall further comprises a free top end.

46. An apparatus for forming an item in a specified shape, said apparatus comprising:

a sidewall defining an area in said specified shape, said sidewall having a free bottom end and a free top end, said bottom end forming a perimeter configured for placing in contact with a surface;

wherein said sidewall is comprised of an aluminum alloy material that has been partially annealed by heating the material to a specified temperature for a specified time;

wherein the specified temperature is within a range of between approximately 640 to 660 degrees F.;

wherein the specified time is approximately 30 minutes;

wherein the apparatus further comprises a first handle on a first side of said sidewall and a second handle on a second side of said sidewall;

wherein each of said first handle and said second handle comprises an upward extending portion and a lateral extending portion;

wherein said lateral extending portion is positioned in a substantially perpendicular orientation with respect to said upward extending portion;

wherein said upward extending portion comprises an opening for reducing the flow of heat from said upward extending portion to said lateral extending portion;

wherein said opening forms a space in said upward extending portion such that said space comprises a range of approximately 25 to 75 percent of a width of the upward extending portion at a widest portion of said opening;

wherein said opening forms a space comprising approximately 50 percent of the width of the upward extending portion at the widest portion of said opening;

wherein said lateral extending portion is spaced a distance above said sidewall during use;

wherein said first handle and said second handle are pivotally attached to said sidewall to allow said first handle and said second handle to be rotated alongside said sidewall;

wherein said first handle and said second handle are constructed of a material having a thermal conductivity less than or equal to approximately 1160 BTU-inches/hour-ft$^2$-° F.;

wherein said sidewall is constructed of a material having a thermal conductivity less than or equal to approximately 1160 BTU-inches/hour-ft$^2$-° F.; and wherein said lateral extending portion comprises a grasping portion comprising a material configured to reduce the transfer of heat from the lateral extending portion.

47. The apparatus of claim 30, wherein said upward extending portion extends in a substantially vertical direction.

48. The apparatus of claim 28, wherein said lateral extending portion extends in a direction away from said sidewall towards an exterior of said specified shape.

* * * * *